(12) United States Patent
Law et al.

(10) Patent No.: US 6,754,873 B1
(45) Date of Patent: Jun. 22, 2004

(54) TECHNIQUES FOR FINDING RELATED HYPERLINKED DOCUMENTS USING LINK-BASED ANALYSIS

(75) Inventors: Kin Lun Law, Redwood City, CA (US); Georges R. Harik, Mountain View, CA (US)

(73) Assignee: Google Inc., Moutain View, CA (US)

( * ) Notice: Subject to any disclaimer, the term of this patent is extended or adjusted under 35 U.S.C. 154(b) by 0 days.

(21) Appl. No.: 09/544,733

(22) Filed: Apr. 6, 2000

Related U.S. Application Data
(60) Provisional application No. 60/155,277, filed on Sep. 20, 1999.

(51) Int. Cl.[7] .......................... G06F 17/00; G06F 17/30
(52) U.S. Cl. .................... 715/501.1; 715/514; 715/513; 707/3; 707/4; 707/5
(58) Field of Search ............................ 715/501.1, 514, 715/513; 707/4, 5, 3

(56) References Cited

U.S. PATENT DOCUMENTS

| | | | | |
|---|---|---|---|---|
| 5,895,470 | A | * 4/1999 | Pirolli et al. | 707/102 |
| 6,285,999 | B1 | * 9/2001 | Page | 707/5 |
| 6,457,028 | B1 | * 9/2002 | Pitkow et al. | 715/513 |
| 6,591,261 | B1 | * 7/2003 | Arthurs | 707/2 |
| 6,665,837 | B1 | 12/2003 | Dean et al. | 715/501.1 |

OTHER PUBLICATIONS

Bharat & Henzinger, "Improved Algorithms for Topic Distillation in a Hyperlinked Environment" 1998 http://216.239.37.104/search?q=cache:PJIP0Z9wxQsJ:gatekeeper.dec.com/pub/DEC/SRC/publications/monika/sigir98/pdf+lmoved+Algorithms+for+topic&hl=en&ie=UTF-8.*

Dean & Henzinger, "Finding related pages in the World Wide Web" Mar. 1, 1999, http://216.239.39.104/search?q=cache:tWTL2B22VcEJ:www.unizh.ch/home/mazzo/reports/www8conf/2148/pdf/pd1.pdf+Finding+Related+Pages+in+the+World+Wide+Web&hl=en&ie=UTF-8.*

Bharat & Henzinger, "Improved Algorithms for Topic Distillation in a Hyperlinked Environment" 1998 http://216.239.37.104/search?q=cache:PJIP0Z9wxQsJ:gatekeeper.dec.com/pub/DEC/SRC/publications/monika/sigir98/pdf+lmoved+Algorithms+for+topic&hl=en&ie=UTF-8.*

* cited by examiner

Primary Examiner—Stephen S. Hong
Assistant Examiner—Adam L. Basehoar
(74) Attorney, Agent, or Firm—Harrity & Snyder LLP

(57) ABSTRACT

Techniques for finding related hyperlinked documents using link-based analysis are provided. Backlink and forwardlink sets can be utilized to find web pages that are related to a selected web page. The scores for links from web pages that are from the same host and links from web pages with numerous links can be reduced to achieve a better list of related web pages. The list of related web pages can be utilized as a feature to a word-based search engine or an addition to a web browser.

19 Claims, 14 Drawing Sheets

About 104143 matches for New York Times
Showing results 1-10, Search took 0.08 seconds
How do I interpret the results?

www.nytimes.com/ — 551
New! Try out GoogleScout — 553 www.nytimes.com/info/help/copyright.html
   New! Try out GoogleScout www.nytimes.com/info/contents/textpath.html
   New! Try out GoogleScout www.nytimes.com/yr/mo/day/
   New! Try out GoogleScout www.nytimes.com/learning/
   New! Try out GoogleScout The New York Times Syndicate
...a new era, The New York Times Syndicate is ready to...
...missed, either. The New York Times Magazine is celebrating...
nytsyn.com/ Cached (8k) New! Try out GoogleScout New York Today city guide and event calendar
...Order home delivery of The New York Times JUNE 30 - JULY 6...
...doors in New York," says William Grimes in today's Times....
www.nytoday.com/ Cached (59k) New! Try out GoogleScout www.nyt.com/
New! Try out GoogleScout Home Page
nytimesfax.com/ Cached (1k) New! Try out GoogleScout nytimes.com/
New! Try out GoogleScout Goooooooooogle →
Result Page: 1 2 3 4 5 6 7 8 9 10  Next page New query: [New York Times]
Search within results?

Try your query on other engines http://www.google.com/search?q=New+York+Times     11/3/99

FIG. 12A

AltaVista Excite HotBot Infoseek Lycos Deja Yahoo! Amazon Open Directory eGroups Copyright ©1999 Google Inc. - About

FIG. 12B

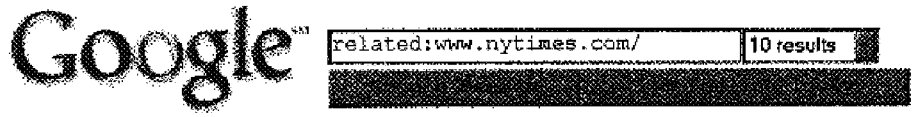

GoogleScout has automatically scouted the web for pages related to www.nytimes.com/
*Tip: Use GoogleScout to get a list of a company's competitors.*

24 related pages for www.nytimes.com/
Showing related pages 1-10, Search took 0.05 seconds
How do I interpret the results?

www.nytimes.com/
New! Try out GoogleScout

CNN Interactive
category books flowers music office travel video MAIN PAGE WORLD U.S. LOCAL POLITICS WEATHER
BUSINESS SPORTS SCI-TECH NATURE ENTERTAINMENT BOOKS TRAVEL FOOD HEALTH STYLE IN-...
www.cnn.com/ Cached (61k) New! Try out GoogleScout USA TODAY
USA TODAYdeskTOPnews Search the web: Nationline Washington World Stocks Scores Baseball NBA NHL Tech
Books Careers Small Business Travel Millennium Hot Sites Web tech Politic...
www.usatoday.com/ Cached (50k) New! Try out GoogleScout washingtonpost.com: News Front
_____ About the site _____ Advertising Info. _____ Send us feedback and
corrections _____ Other Post Co. Web sites Wednesday, June 30,...
www.washingtonpost.com/ New! Try out GoogleScout Los Angeles Times Web Site
Wednesday, June 30, 1999 06:59 PM News ----------- Main Page News Wires AP The Wire ------------ Today's Paper
------------ Columns Commentary Food Gov't & Politics ...
www.latimes.com/ Cached (35k) New! Try out GoogleScout www.msnbc.com/
New! Try out GoogleScout www.chicago.tribune.com/
New! Try out GoogleScout

FIG. 13A www.abcnews.com/
New! Try out GoogleScout

The Christian Science Monitor Electronic Edition
This page uses frames, but your browser doesn't support them.
www.csmonitor.com/ Cached (0k) New! Try out GoogleScout Welcome to Mercury Center
Silicon Valley news and information from the Pulitzer Prize-winning San Jose Mercury News. -- Last updated at 5:21 p.m.
PDT Wednesday, June 30, 1999 Fed raises rates as expect...
http://www.google.com/search?site=search&num=10&q=related:63910&...:www.nytimes.com    11/3/99

TECHNIQUES FOR FINDING RELATED HYPERLINKED DOCUMENTS USING LINK-BASED ANALYSIS

This application claims the benefit of U.S. Provisional Application No. 60/155,277, filed Sep. 20, 1999, which is hereby incorporated by reference.

CROSS-REFERENCE TO RELATED APPLICATIONS

This application is related to U.S. patent application No. 08/655,149, filed May 30, 1996, now U.S. Pat. No. 5,754,760, which is hereby incorporated by reference.

BACKGROUND OF THE INVENTION

The present invention relates to hyperlinked document systems. More specifically, the invention relates to techniques for finding related hyperlinked documents using link-based analysis.

The Internet, and more specifically the World Wide Web, provides users all over the world with virtually unlimited amounts of information in the form of hyperlinked documents. As new information is added to the Web, more hyperlinked documents are added that include links to the existing web of information.

One of the reasons for the almost explosive growth of information on the Web is that virtually anyone can add hyperlinked documents, which will be immediately available to users around the world. For better or worse, the Web is virtually unstructured, meaning that users are free to add information to the Web in almost any way they desire. Although this provides great flexibility in adding information to the Web, it can significantly increase the difficulty in finding information that is desired.

Probably the most popular mechanism for finding information on the Web is to use word-based search engines. Word-based search engines allow a user to enter words, phrases, and other search criteria so that the search engine can retrieve the hyperlinked documents that best match the user's search criteria.

Word-based search engines have been tremendously successful in allowing users to find the information they desire on the Web. There are times, however, when a user wants to find hyperlinked documents that are related to and at the same level of generality to a selected hyperlinked document. For example, a user may be viewing a company's web site and wish to see other web sites for competitive companies. As another example, a user may have found a university's computer science department web site and the user may desire to see computer science department web sites of other universities. Traditional word-based search engines may not provide satisfactory results for these types of desired information.

Some web sites have recognized this deficiency and have taken on the pain staking process of categorizing the information on the Web. Although it is possible that the related hyperlinked documents that are desired are in a single category, it often happens that the related hyperlinked documents are spread throughout multiple categories. For example, if information regarding each university is placed in a separate category, one will not find a single category that includes information regarding the computer science departments of multiple universities. Additionally, categorizing the information on the Web takes a considerable amount of time and typically requires human decision making to categorize the information.

Therefore, what is needed are innovative techniques for finding related hyperlinked documents without requiring human categorization of the information.

SUMMARY OF THE INVENTION

The present invention provides innovative techniques for finding related hyperlinked ocuments using link-based analysis. The link structure of the hyperlinked documents is analyzed in order to find hyperlinked documents that are related to and at the same level of generality of a hyperlinked document. The invention can be utilized any number of ways including as an additional feature for a word-based search engine or as an addition on a web browser. Some specific embodiments of the invention are described below.

In one embodiment, the invention provides a computer implemented method of generating lists of hyperlinked documents that are related to a given or selected hyperlinked document. A first set of hyperlinked documents that have a forward link to the selected hyperlinked document is provided. Additionally, a second set of hyperlinked documents that are pointed to by the forward links in the hyperlinked documents in the first set is provided. A value is assigned to each forward link in each of the hyperlinked documents in the first set, with the value being reduced for a forward link if there are multiple hyperlinked documents from the same host as the hyperlinked document that includes the forward link. A score is generated for each hyperlinked document in the second set according to the values of the forward links pointing to the hyperlinked document. Accordingly, a list of related hyperlinked documents is generated from the second set according to the score of the hyperlinked documents. In a preferred embodiment, the related hyperlinked documents are displayed in an order based on their score.

In another embodiment, the invention provides a computer implemented method of generating lists of related hyperlinked documents. A first set of hyperlinked documents that have a forward link to a selected hyperlinked document is provided. A second set of hyperlinked documents that are pointed to by the forward links in the hyperlinked documents of the first set is also provided. A value is assigned to each forward link in each of the hyperlinked documents in the first set, with the value being reduced according to the number of forward links in the hyperlinked document that includes the forward link. A score is generated for each hyperlinked document in the second set according to the values of the forward links pointing to the hyperlinked document. Lastly, a list of related hyperlinked documents is generated from the second set according to the score of the hyperlinked documents.

Other features and advantages of the invention will become readily apparent upon review of the following description in association with the accompanying drawings, where the same or similar structures are designated with the same reference numerals.

BRIEF DESCRIPTION OF THE DRAWINGS

FIGS. 12A and 12B show a web page including word-based search results and a link to find related web pages according to a link-based analysis.

FIGS. 13A and 13B show a web page including related web pages from a link-based analysis.

DETAILED DESCRIPTION OF PREFERRED EMBODIMENTS

In the description that follows, the present invention will be described in reference to embodiments that generate lists of related web pages from the Word Wide Web. More specifically, the embodiments will be described in reference to generating lists of related web pages utilizing link-based analysis requiring little or no human decision making. However, embodiments of the invention are not limited to any particular environment, application or specific implementation. For example, the embodiments described below are in reference to web pages but the invention can be advantageously applied to any type of hyperlinked document. Therefore, the description of the embodiments that follows is for purposes of illustration and not limitation.

Figure 1:
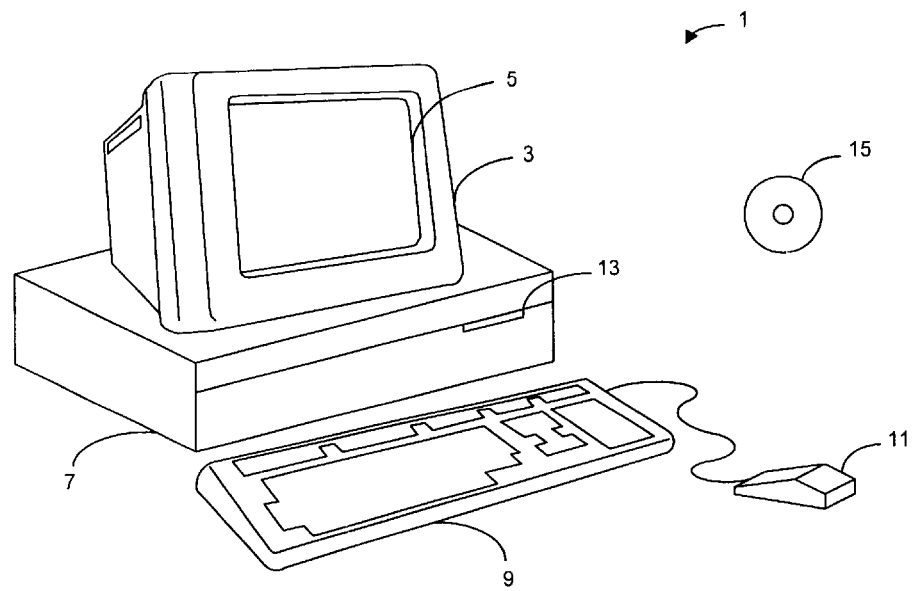
FIG. 1 illustrates an example of a computer system that can be utilized to execute the software of an embodiment of the invention.

FIG. 1 illustrates an example of a computer system that can be used to execute the software of an embodiment of the invention. FIG. 1 shows a computer system 1 that includes a display 3, screen 5, cabinet 7, keyboard 9, and mouse 11. Mouse 11 can have one or more buttons for interacting with a graphical user interface. Cabinet 7 houses a CD-ROM drive 13, system memory and a hard drive (see FIG. 2) which can be utilized to store and retrieve software programs incorporating computer code that implements the invention, data for use with the invention, and the like. Although CD-ROM 15 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 2:
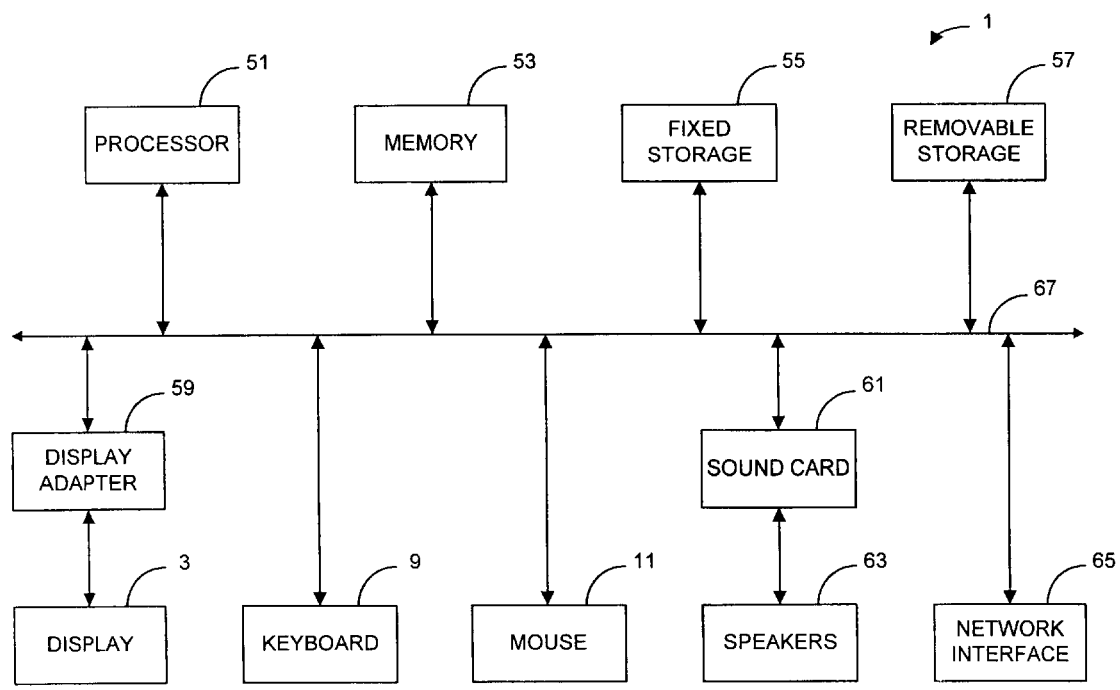
FIG. 2 illustrates a system block diagram of the computer system of FIG. 1.

FIG. 2 shows a system block diagram of computer system 1 used to execute the software of an embodiment of the invention. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, speakers 63, and network interface 65. Other computer systems suitable for use with the invention can include additional or fewer subsystems. For example, another computer system could include more than one processor 51 (i.e., a multi-processor system) or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems can also be utilized.

Figure 3:
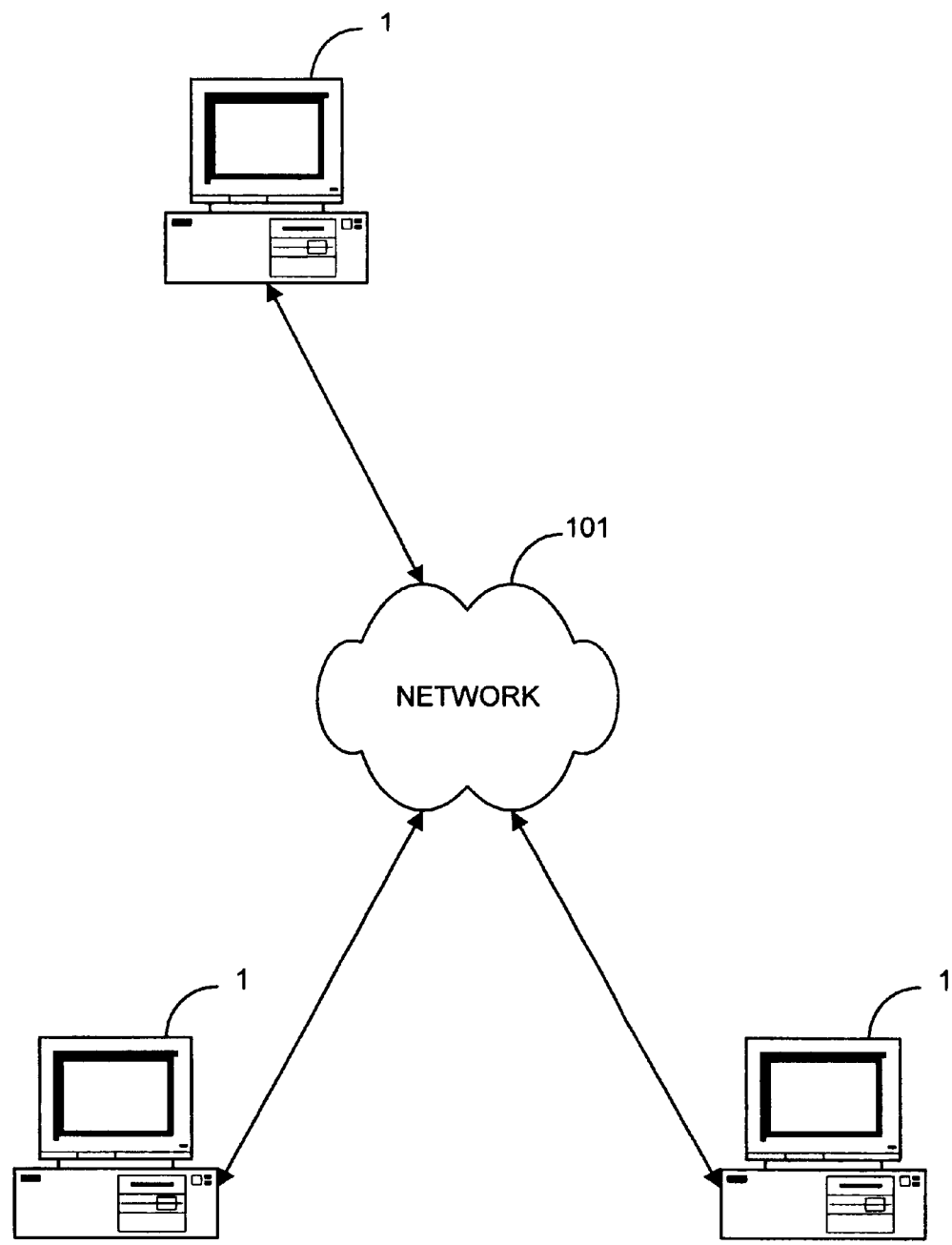
FIG. 3 illustrates a network of multiple computer systems such as the Internet.

FIG. 3 shows a network of multiple computer systems. A network 101 provides communication between multiple computer systems 1. In a wide area network such as the Internet, some of the computer systems are servers (or hosts) and provide access to resources or services to client computer systems on the network. With respect to web pages, there are multiple server computer systems that store the web pages that make up the Web. The web pages typically include links in the form of uniform resource locators (URLs) that are a link to another web page, whether it is on the same server or a different one.

As described above, the Web is a distributed network of web pages. Networks of hyperlinked documents can also be present in local area networks (e.g., intranets). The operation of these intranets is very similar to the Internet except that it is not uncommon for all or a majority of the hyperlinked documents of an intranet to be stored on a single server computer system.

Figure 4:
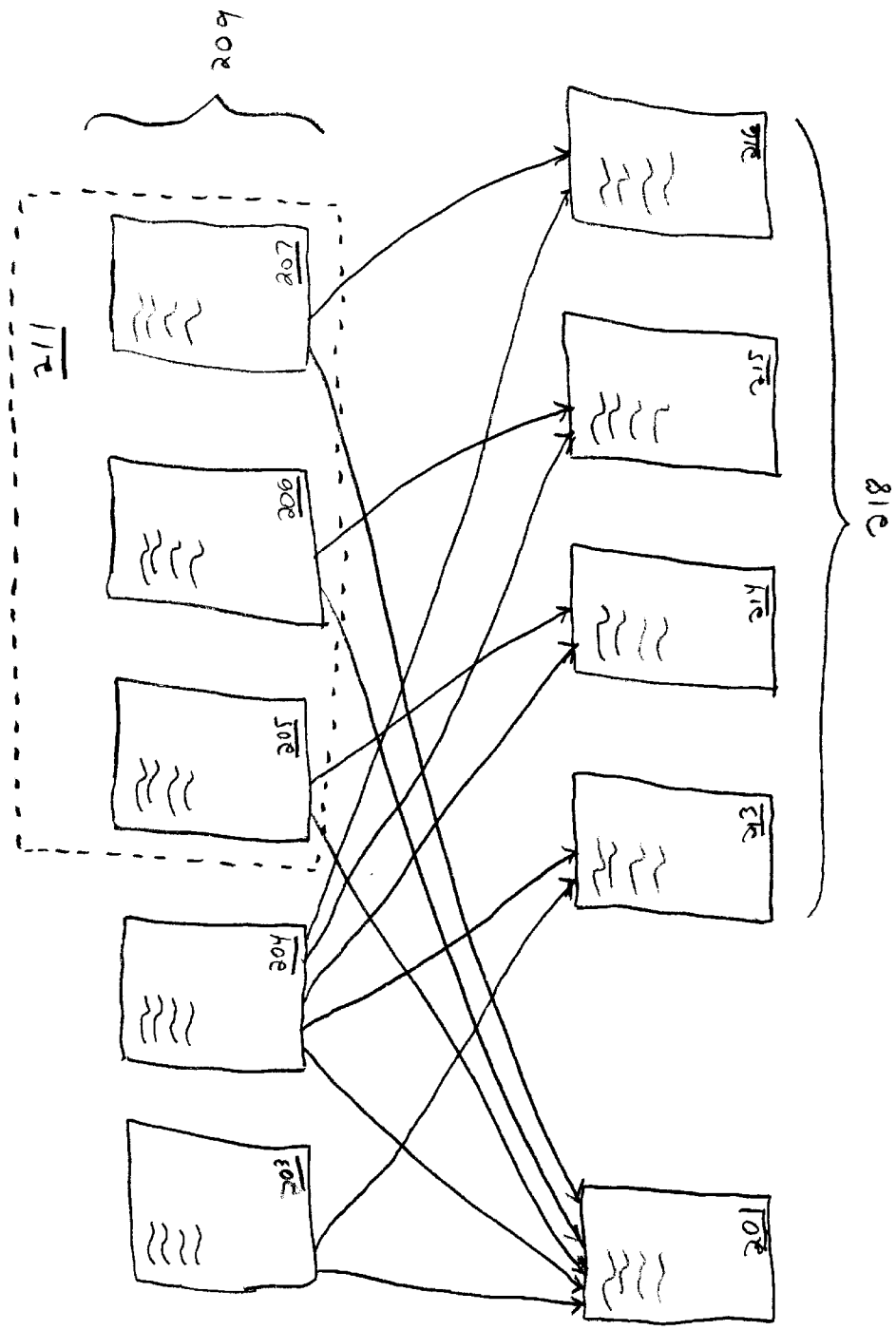
FIG. 4 shows an example of linked web pages in order to demonstrate scoring techniques of the present invention.

Now that typical computer systems and networks have been described, it may be beneficial to show an example of related web pages. FIG. 4 shows an example of linked web pages to demonstrate how related web pages can be obtained from linked-based analysis. A web page 201 is the selected web page of interest in which it is desirable to find related web pages.

Web pages 203–207 include one or more links to web page 201 as indicated by the arrows. A backlink set 209 includes web pages 203–207 meaning that the backlink set of web pages is the set of web pages that include a link to a specific web page, shown here as web page 201. A host 211 stores web pages 205–207 as indicated, the importance of which will be described in more detail below.

Web pages 213–216 are web pages that are pointed to by at least one web page in backlink set 209. In other words, there is at least one web page in backlink set 209 that includes a link that points to one of web pages 213–216. A forwardlink set 218 includes web pages 213–216 and is called such because it is derived from forward links from the backlink set. In order to facilitate describing the invention, web page 201 will not be described as being a member of forwardlink set 218. However, web page 201 can be considered to be a ember of forwardlink set 218 in some embodiments as will be described below.

For some very popular web pages, the backlink set can be quite large (e.g., a million links or more). Therefore, in a preferred embodiment, for backlink sets that have more than a predetermined number of links (e.g., 10,000), a random sampling of the links is utilized. In other words, if the backlink set has more than a predetermined number of links, fewer links can be selected at random (or selected in another manner) to be processed.

The web pages of forwardlink set 218 can be thought of as being related to and at the same level of generality of web page 201. This is because there is at least one web page that includes a link to both web page 201 and each of the web pages in forwardlink set 218. Thus, a list of related web pages can be generated from the web pages and the backlink set.

One way that the web pages of forwardlink set 218 can be scored according to "relatedness" to web page 201 is according to the number of links to each web page from backlink set 209. Utilizing this technique, each web page in forwardlink set 218 has a score of 2 because there are two links to each web page from the web pages of the backlink set. Accordingly, the same scores indicate that all of the web pages of web page 218 are equally related to web page 201. For at least the following reasons, this result may not be satisfactory.

Within a single host, the web pages typically include many links to other web pages within the same host. For example, a company's web site may include many links that interlink different web pages on the same host (or domain or other grouping of web pages). Thus, referring back to FIG. 4, web page 201 could describe a product of the company while web pages 214, 215, and 216 could correspond to other web pages of the company on the same host that are relatively unrelated to the product from web page 201. Assuming that web page 213 describes a competing product from a competitor company (and hence likely a different host), it would be desirable for web page 213 to get a higher score of "relatedness" than web pages 214–216 because it is more likely the user is interested in a competing product than a relatively unrelated web page from the same host.

Another problem is that some web pages have relatively few links while others have relatively many links. If each link is counted equally, the web pages with relatively many links gets more "votes" for the "relatedness" of the web pages. For example, referring to FIG. 4, web pages 203 and 205–207 all include two links. However, web page 204 has four links, which is twice as many as in the other web pages of backlink set 209. Because web page 204 has more links, the web page has a greater impact on selecting related web pages than the other web pages of the backlink set. It would be desirable if the web pages of the backlink set were considered relatively equal regardless of the number of links each web page includes.

It should be noted that FIG. 4 shows a very simple example in order to illustrate some of the problems that can be encountered in selecting related web pages. As one can imagine, typically the web pages include many more links and the number of web pages involved in determining related web pages is far greater than that shown in FIG. 4. Nevertheless, FIG. 4 is useful in illustrating some problems related to generating a list of related web pages. Also, the links were shown as coming from the bottom of the web pages for simplicity, but links are typically embedded within the text of the web pages as will be shown in subsequent figures.

Figure 5:
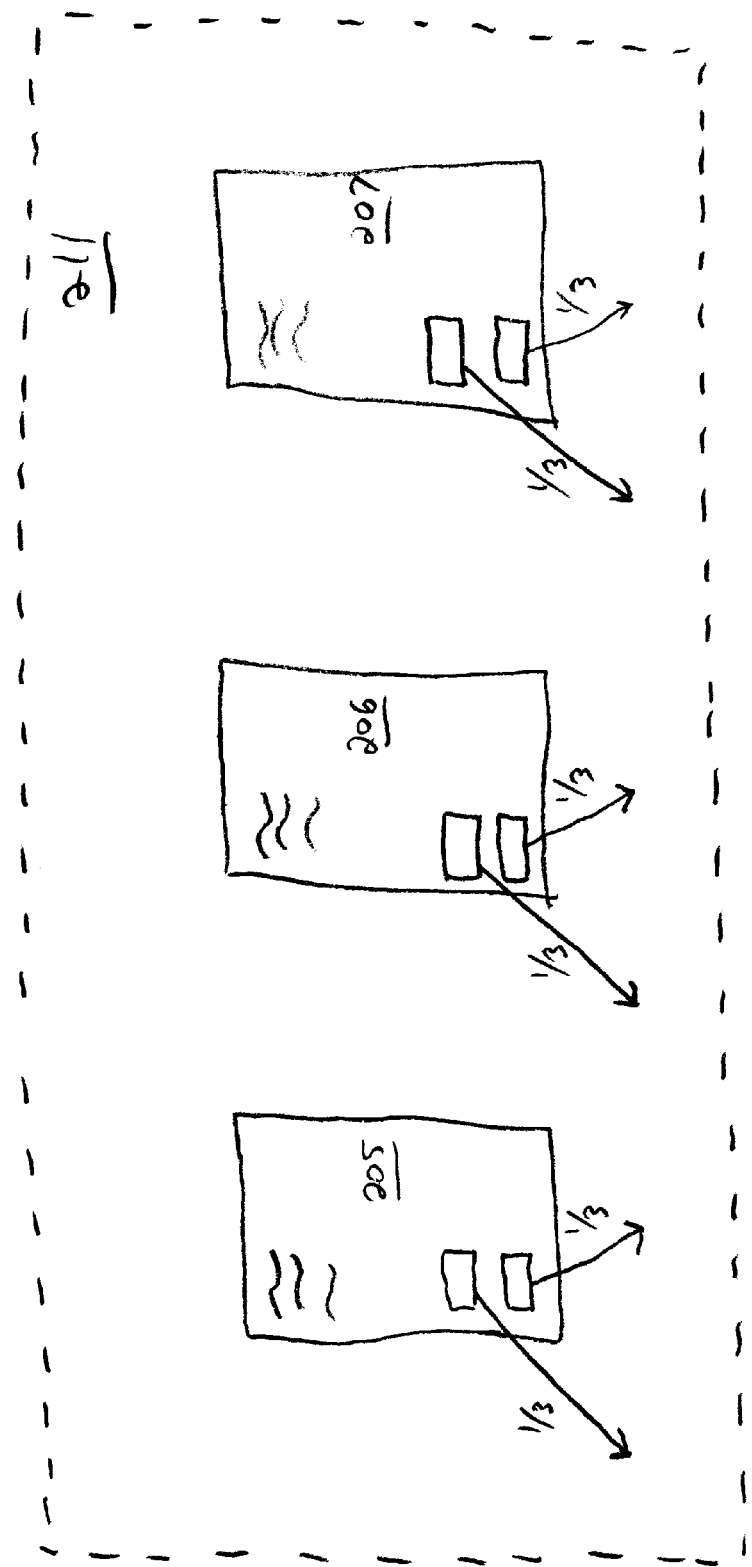
FIG. 5 shows linked web pages of FIG. 4 to more clearly show a scoring technique that reduces values of links if the web pages are from the same host.

FIG. 5 shows one technique that can be utilized to reduce the importance of web pages from the same host. As described above in reference to FIG. 4, web pages 205–207 are in the same host. Instead of giving each link from these web pages a value of, for example, 1, the links are given a value of 1 divided by the number of web pages that are from the same host, which in this case is 3. Accordingly, each link from web pages 205–207 are given a value of ⅓ as shown. By dividing the value for a link by the number of web pages in the same host, the amalgam of web pages from the same host have a total of 6*⅓=2 "votes," which would be the same as a single web page with two links from another host.

Figure 6:
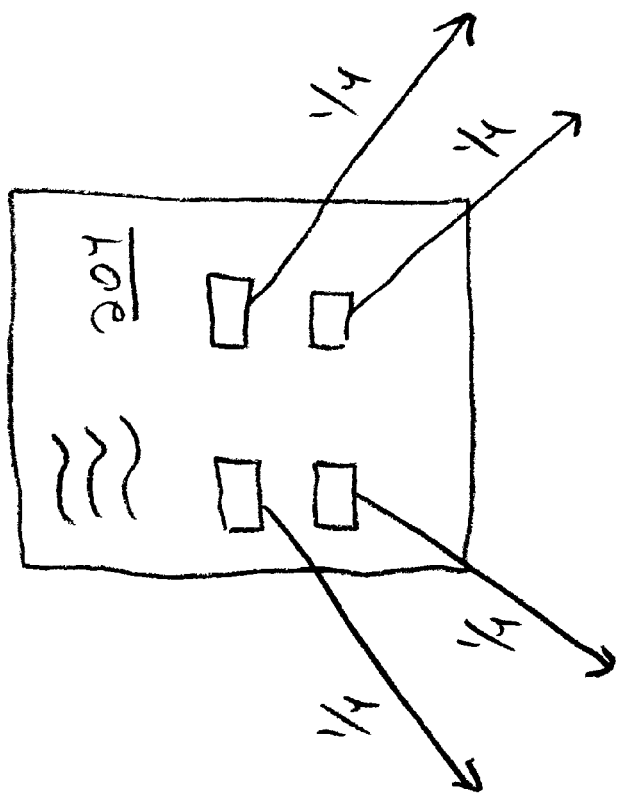
FIG. 6 shows a web page of FIG. 4 in order to more clearly indicate the scoring technique that reduces a value of a link if there are multiple links in a hyperlinked document.

FIG. 6 shows a technique in which to reduce the importance of the individual links from a web page with relatively many links. In order to reduce the value for each link from a web page with many links, the value of one is divided by the number of links in the web page. As shown in FIG. 6, web page 204 includes 4 links and so the value of each link from the web page is ¼. In this way, web pages that have relatively many links do not get more than their fair share of "votes" for related web pages. In a preferred embodiment, the value for each link is 1 divided by the number of links in the web page plus a predetermined amount (e.g., 10).

Although the techniques described in reference to FIGS. 5 and 6 can be used alone, in preferred embodiments, the techniques are used in conjunction to generate an accurate list of related web pages. The techniques can be combined by multiplying all the values for a given link in order to determine the final value for the link. As an example, the following table shows the scores that would be generated for each of the web pages of forwardlink set 218 utilizing this technique:

| Web Page | Links | Score |
| --- | --- | --- |
| 213 | (1/2) + (1/4) | 0.75 |
| 214 | (1/4) + (1/3 * 1/2) | 0.415 |
| 215 | (1/4) + (1/3 * 1/2) | 0.415 |
| 216 | (1/4) + (1/3 * 1/2) | 0.415 |

One or more of these techniques can also be combined with a measure of text-based similarity of the web pages.

Figure 7:
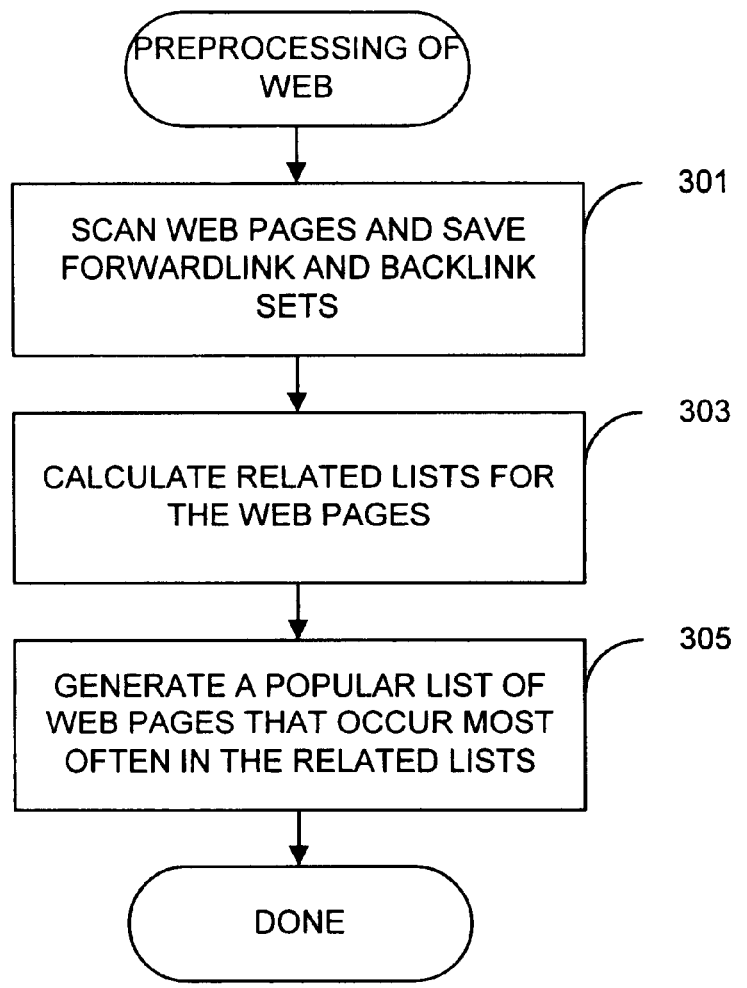
FIG. 7 shows a flowchart of a process of preprocessing a web of information.

FIG. 7 shows a flowchart of a process of preprocessing the Web in order to generate banklink sets. The Web does not include backlink sets so it is beneficial to scan the Web and identify backlink sets for each of the web pages on the Web. This allows related web pages to be identified in a much more efficient manner because the backlink sets are already calculated.

At step 301, web pages are scanned and forwardlink and backlink sets are saved. As each web pages is processed, the forward links in the web page are identified and saved as a forwardlink set. Additionally, the current web page is added to the backlink set of each of the web pages that are pointed to by links in the current web page. The generation of forwardlink and backlink sets is well suited for an automated process and can be continually run to identify and save changes in the Web.

In addition to calculating backlink sets, lists of related web pages can be calculated for each of the web pages on the Web at a step 303. The list of related web pages can be calculated as described below in reference to FIGS. 8 and 9. Although optional, the lists of related web pages can be utilized to generate a popular list of web pages that occur most often in the related lists at a step 305.

The popular list includes web pages that occur most frequently in the lists of related web pages. For example, a popular site like the yahoo web page may occur very frequently in the lists of related web pages. The popular list may be a predetermined number (e.g., 2000) of web pages that occur most often in the lists of related web pages. The popular list can be utilized to more accurately display the list of related web pages as described in more detail in reference to FIG. 10.

Figure 8:
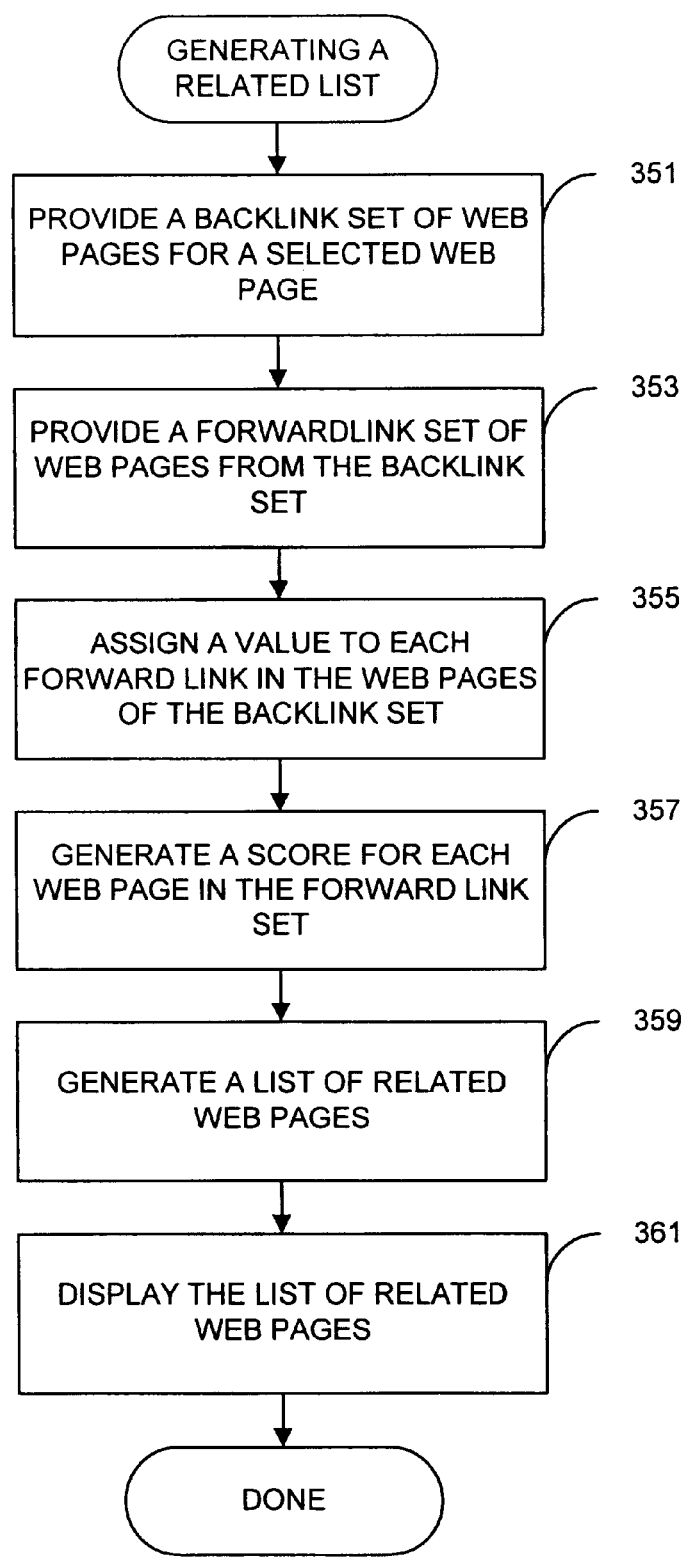
FIG. 8 shows a flowchart of a process of generating a list of related web pages.

FIG. 8 shows a flowchart of a process of generating a list of related web pages. For example, the list of related web pages can be generated upon request from a user for a web page being displayed in a web browser or for a web page that is being displayed (e.g., as a link) in results from a web search.

At a step 351, a backlink set of web pages is provided for a given or selected web page. The selected web page is the web page for which the list of related web pages should be generated. The backlink set of web pages can be easily determined from the backlink set generated during preprocessing of the web as described in FIG. 7.

A forwardlink set of web pages is provided from the backlink set at a step 353. The forwardlink set of web pages are the web pages that are pointed to by the forward links in the backlink set for the selected web page. The forwardlink set can be generated during preprocessing but since the time to generate the forwardlink set is minimal, in some embodiments the forwardlink set is generated in real time when the user asks for a list of related web pages for the selected web page.

At a step 355, a value is assigned to each forward link of the web pages of a backlink set. A process of assigning a value to the forward links will be described in more detail in reference to FIG. 9.

A score is generated for each web page in the forwardlink set at a step 357. The score can be generated by adding together all the values for each of the forward links that points to each web page in the forwardlink set.

Once the scores are generated for each of the web pages in the forwardlink set, a list of related web pages can be generated at a step 359. The list of related web pages can be generated from the forwardlink set according to the score of the web pages. In other words, the score is an indication of the relatedness to the selected web page and the higher the score, the more related the web page is.

At a step 361, the list of related web pages is displayed. The displayed list of related web pages can be a predetermined number of the most highly related web pages, web pages that have a score greater than a threshold or any other way of selecting a number of related web pages to display. A process of displaying a list of related web pages will be described in more detail in reference to FIG. 10.

Figure 9:
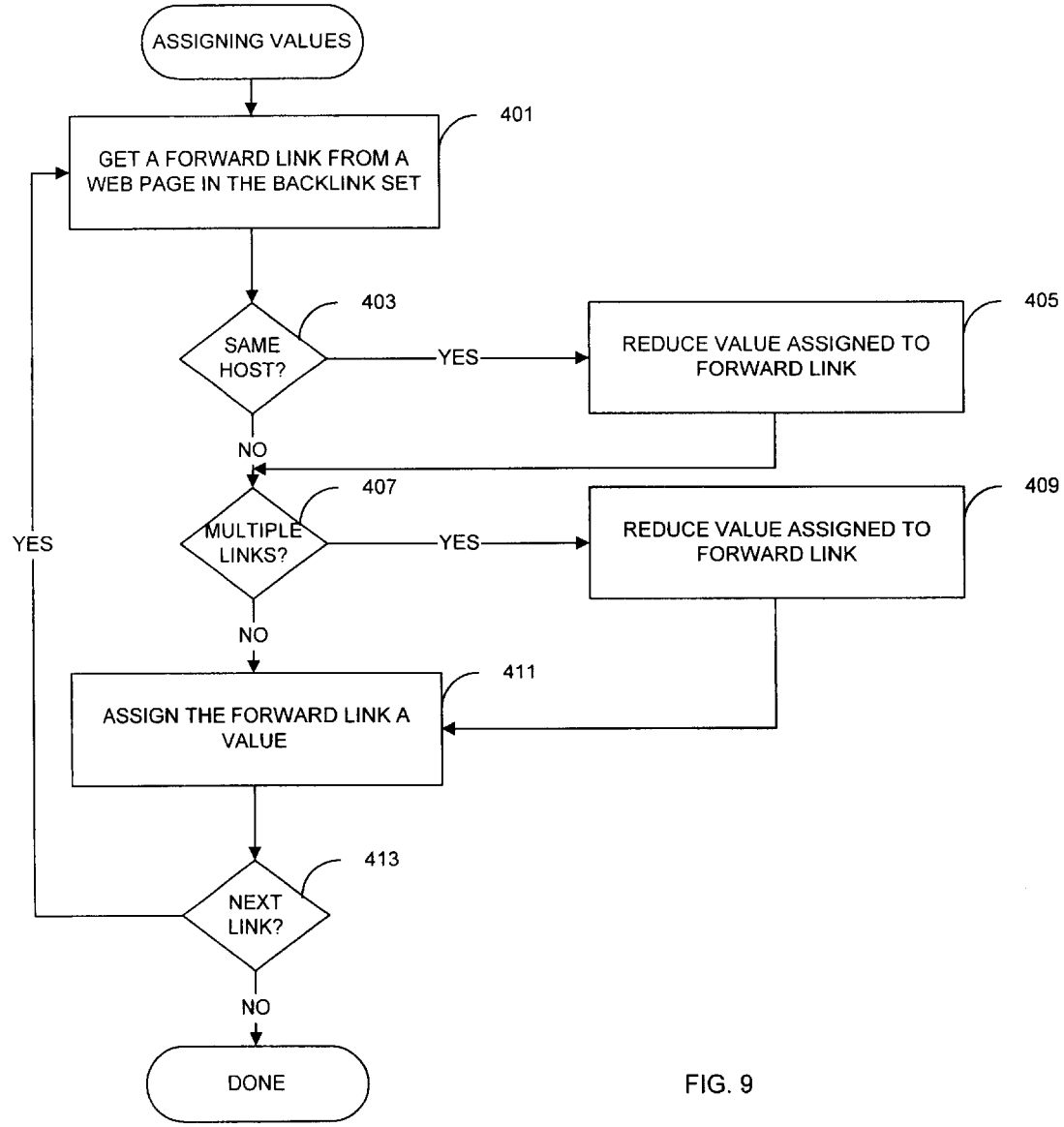
FIG. 9 shows a flowchart of a process of assigning values to forward links in a backlink set of web pages.

FIG. 9 shows a flowchart of a process of assigning values to each of the forward links in the web pages of the backlink set. At a step 401, a forward link is obtained from a web page in the backlink set. It is determined if the web page that includes the forward link is on the same host as one or more other web pages in the backlink set. If there are multiple web pages from the same host, the value assigned to the forward link is reduced at a step 405. The value can be reduced by dividing the value by the number of web pages from the same host or in any other manner.

At a step 407, it is determined if there are multiple forward links in the web page in the backlink set. If there are multiple links, the value assigned to the forward link is reduced at a step 409. The value can be reduced by dividing the value by the number of forward links in the web page or in any other manner. In one embodiment, the value is reduced by dividing the value (e.g., 1) by the number of forward links in the web page plus a predetermined value (e.g., 10). In this way, a web page that has numerous links will have approximately the same voting power as a web page with few links.

The value that has been calculated for the forward link is assigned to the link at a step 411. Once the forward link has been processed, it is determined whether there is a next forward link to process at a step 413. If there is another link to process, the flow continues to step 401.

Figure 10:
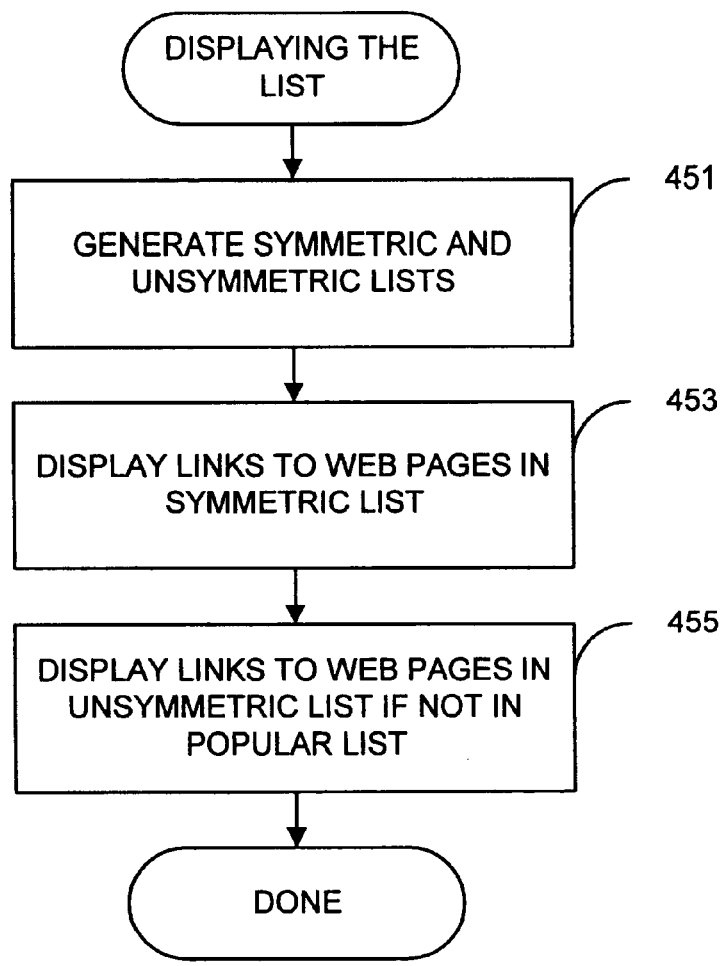
FIG. 10 shows a flowchart of a process of displaying the list of related web pages.

FIG. 10 shows a flowchart of a process of displaying the list of related web pages. At a step 451, symmetric and unsymmetric lists of related web pages are generated. Two web pages are symmetrically related if each is on the other's list of related web pages. In a preferred embodiment, two web pages are symmetrically related if each is in the top N (e.g., 30) web pages on the other's list of related web pages. Accordingly, each web page in the list of related web pages is processed and a list of related web pages is generated for each web page. These lists of related web pages are then checked to see if the selected web page is included in the new related list. If it is, the two web pages are related symmetrically; otherwise, the two web pages are unsymmetrically related. Thus, the list of related web pages is separated into a symmetric list and unsymmetric list in this manner.

The links to web pages in the symmetric list are displayed at a step 453. The links to symmetric web pages are displayed first in a preferred embodiment because it has been found that web pages that are related symmetrically are more often web pages of interest. After the symmetric web pages are displayed, the links to web pages in the unsymmetric list are displayed at a step 455. In a preferred embodiment, not all the web pages on the unsymmetric list are displayed but only those that are not included in the popular list that was generated during the preprocessing of the Web as described in FIG. 7. As mentioned above, the popular list includes web pages that occur very frequently in the list of related web pages so it has been found to be beneficial to remove these from the related web pages that are displayed.

Figure 11:
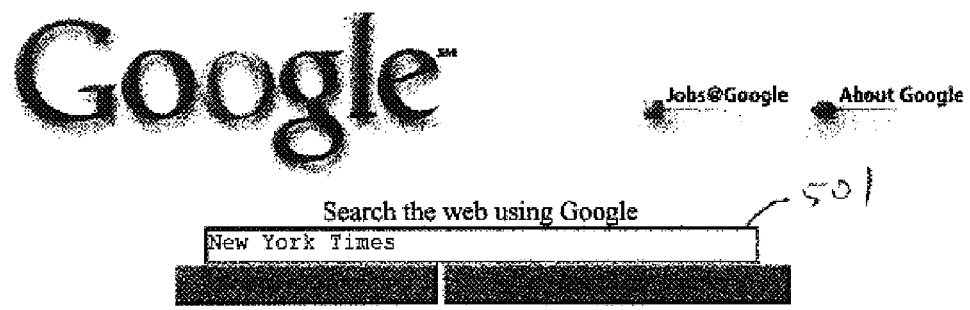
FIG. 11 shows an example of a web page for a word-based search engine that includes an embodiment of the invention.

Now that embodiments of the invention have been described in detail, it may be beneficial to see screen displays of an example. FIG. 11 shows a screen display of a word-based search engine that incorporates an embodiment of the present invention. As shown, a user has indicated that she would like to search for web pages that include a match for New York Times as entered in a text window 501.

FIGS. 12A and 12B show the results of the search for web pages matching New York Times. As shown, the links to the best 10 matches are displayed. A first link 551 is to the New York Times web page. The other links also in some way match New York Times.

Now assume that the user wants to find web pages that are related to the web page pointed to by link 551. She can then activate a link 553 that will generate and display a list of web pages that are related to the New York Times web page.

Figure 13B:
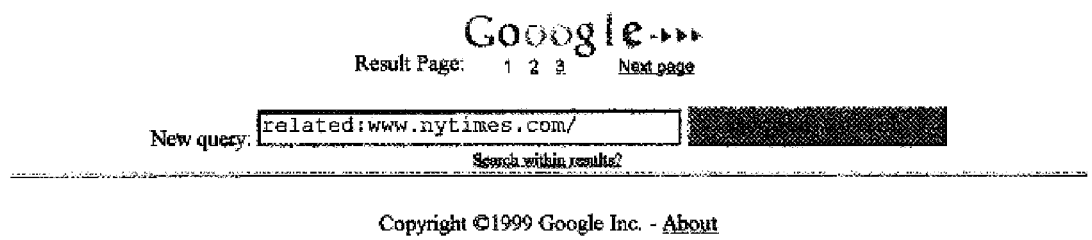

FIGS. 13A and 13B show a screen display of a list of web pages that are related to the New York Times web page. As shown, the list includes the New York Times site and also includes links to web pages that are at the same level of generality including CNN Interactive, USA Today, the Washington Post, the Los Angeles Times, and the like. Many of the links displayed are also competitors to the selected New York Times web page.

In a preferred embodiment, each web page is assumed to have a self link to itself. This means that each web page will be included in both the backlink and forwardlink sets. It has been found that including these self links provides better results for web pages that have relatively few links to them.

While the above is a complete description of preferred embodiments of the invention, various alternatives, modifications, and equivalents can be used. It should be evident that the invention is equally applicable by making appropriate modifications to the embodiments described above. Therefore, the above description should not be taken as limiting the scope of the invention that is defined by the metes and bounds of the appended claims along with their full scope of equivalents.

What is claimed is:

1. A computer implemented method of generating lists of related hyperlinked documents, comprising:

providing a first set of hyperlinked documents that have a forward link to a selected hyperlinked document and a second set of hyperlinked documents that are pointed to by the forward links in the hyperlinked documents of the first set;

assigning values to the forward links in the hyperlinked documents in the first set, the value being reduced for a forward link if there are multiple hyperlinked documents from the same host as the hyperlinked document that includes the forward link;

wherein the value is further reduced by dividing the value based on a number of forward links in the hyperlinked documents that includes the forward link plus a predetermined amount;

generating a score for each hyperlinked document in the second set based on the values of the forward links pointing to the hyperlinked document, and generating a first list of related hyperlinked documents from the second set based on the scores of the hyperlinked documents;

wherein the selected hyperlinked document is displayed in result of a search and a user request to display the first list for the selected hyperlinked document.

2. The method of claim 1, wherein the values are reduced when there are multiple hyperlinked documents from the same host by dividing the value by the number of hyperlinked documents from the same host.

3. The method of claim 1, wherein generating a list of related hyperlinked documents includes selecting hyperlinked documents in the second set that have scores above a threshold.

4. The method of claim 1, wherein generating a list of related hyperlinked documents includes selecting a predetermined number of hyperlinked documents in the second set with highest scores.

5. The method of claim 1, wherein each hyperlinked document is given a forward link to itself.

6. The method of claim 1, further comprising displaying the first list.

7. A computer implemented method of generating lists of related hyperlinked documents, comprising:

providing a first set of hyperlinked documents that have forward links to a selected hyperlinked document and a second set of hyperlinked documents that are pointed to by the forward links in the hyperlinked documents of the first set;

assigning values to the forward links in the hyperlinked documents in the first set, the value being reduced for a forward link if there are multiple hyperlinked documents from the same host as the hyperlinked document that includes the forward link;

generating a score for each hyperlinked document in the second set according to the values of the forward links pointing to the hyperlinked document; and generating a first list of related hyperlinked documents from the second set according to the scores of the hyperlinked documents;

wherein the value of a forward link is reduced based on the number of forward links in the hyperlinked document that includes the forward link; and wherein the value is reduced by dividing the value by a number based on the number of forward links plus a predetermined amount.

8. A computer implemented method of generating lists of related hyperlinked documents, comprising:

providing a first set of hyperlinked documents that have forward links to a selected hyperlinked document and a second set of hyperlinked documents that are pointed to by the forward links in the hyperlinked documents of the first set;

assigning values to the forward links in the hyperlinked documents in the first set, the value being reduced for a forward link if there are multiple hyperlinked documents from the same host as the hyperlinked document that includes the forward link, and the value being further reduced by dividing the value based on a number of forward links plus a predetermined amount;

generating a score for each hyperlinked document in the second set according to the values of the forward links pointing to the hyperlinked document;

generating a first list of related hyperlinked documents from the second set based on the scores of the hyperlinked documents;

generating a second list of related hyperlinked documents for each of the hyperlinked documents in the first list; and removing a hyperlinked document from the first list if the selected hyperlinked document is not in the second list of a hyperlinked document in the first set.

9. The method of claim 8, further comprising generating a third list of related hyperlinked documents that includes each of the hyperlinked documents that is removed from the first list.

10. The method of claim 9, further comprising removing a hyperlinked document from the third list if the selected hyperlinked document is in a third set of hyperlinked documents, the third set being hyperlinked documents that are a most popularly occurring set of hyperlinked documents that are determined to be related to other hyperlinked documents.

11. The method of claim 10, further comprising generating the third set by generating a list of related hyperlinked documents for each hyperlinked document and selecting a predetermined number of hyperlinked documents that appear in the lists of related hyperlinked documents most often.

12. A computer implemented method of generating lists of related hyperlinked documents, comprising:

providing a first set of hyperlinked documents that have forward links to a selected hyperlinked document and a second set of hyperlinked documents that are pointed to by the forward links in the hyperlinked documents of the first set;

assigning values to the forward links in the hyperlinked documents in the first set, the value being reduced for a forward link if there are multiple hyperlinked documents from the same host as the hyperlinked document that includes the forward link, and the value being further reduced by dividing the value based on a number of forward links plus a predetermined amount;

generating a score for each hyperlinked document in the second set based on the values of the forward links pointing to the hyperlinked document; and generating a first list of related hyperlinked documents from the second set based on the scores of the hyperlinked documents;

wherein the selected hyperlinked document is displayed in a web browser and a user requests to display the first list for the selected hyperlinked document.

13. A computer implemented method of generating lists of related hyperlinked documents, comprising:

providing a first set of hyperlinked documents that have forward links to a selected hyperlinked document and a second set of hyperlinked documents that are pointed to by the forward links in the hyperlinked documents of the first set;

assigning values to forward links in the hyperlinked documents in the first set, the value being reduced by dividing the value based on a number of forward links in the hyperlinked document that includes the forward link plus a predetermined amount;

generating a score for each hyperlinked document in the second set according to the values of the forward links pointing to the hyperlinked document; and generating a first list of related hyperlinked documents from the second set based on the scores of the hyperlinked documents;

wherein the selected hyperlinked document is displayed in result of a search and a user request to display the first list for the selected hyperlinked document.

14. The method of claim 13, wherein the value is reduced for a forward link if there are multiple hyperlinked documents from the same host as the hyperlinked document that includes the forward link.

15. The method of claim 13, wherein generating a list of related hyperlinked documents includes selecting hyperlinked documents in the second set that have scores above a threshold.

16. The method of claim 13, wherein generating a list of related hyperlinked documents includes selecting a predetermined number of hyperlinked documents in the second set with highest scores.

17. The method of claim 13, wherein each hyperlinked document is given a forward link to itself.

18. A computer implemented method of generating fists of related hyperlinked documents, comprising:

providing a first set of hyperlinked documents that have forward links to a selected hyperlinked document and a second set of hyperlinked documents that are pointed to by the forward links in the hyperlinked documents of the first set, assigning values to forward links in the hyperlinked documents in the first set, the value being reduced based on the number of forward links in the hyperlinked document that includes the forward link;

generating a score for each hyperlinked document in the second set according to the values of the forward links pointing to the hyperlinked document; and generating a first list of related hyperlinked documents from the second set according to the scores of the hyperlinked documents;

wherein the value is reduced by dividing the value by a number based on a number of forward links plus a predetermined amount.

19. The method of claim 18, wherein the value is further reduced by dividing the value by the number of hyperlinked documents from the same host.

\* \* \* \* \*